Inventor
George E. Garno
Eugene A. Engstrom
By Geo. W. Kennedy Jr.
Attorney

Patented Sept. 22, 1931

1,823,893

UNITED STATES PATENT OFFICE

GEORGE E. GARNO AND EUGENE A. ENGSTROM, OF WORCESTER, MASSACHUSETTS, ASSIGNORS TO THE HEALD MACHINE COMPANY, OF WORCESTER, MASSACHUSETTS, A CORPORATION OF MASSACHUSETTS

WORK HEAD FOR GRINDING MACHINES

Application filed May 25, 1928. Serial No. 280,552.

The invention relates to a chuck carrying work head for grinding machines, and particularly to means for centering a workpiece in the chuck with its axis coinciding with the axis of the chuck. More specifically the invention provides a work centering plug upon which the bore of the work piece may be impaled by the operator as he loads the chuck, the plug being yieldable so that it will be forced into the chuck when the clamping jaws of the latter are brought against the front face of the workpiece.

A further feature of the invention resides in the mechanism for withdrawing the centering plug completely out of the way of the grinding wheel or other tool, said means being controlled by the stop and start lever that controls the rotation of the chuck.

Still further features of the invention reside in the use of the draw bar mechanism of the chuck to place the centering plug in operative position and the mounting of the centering plug upon the tube or pipe that conveys coolant to the work piece.

The above and other objects of the invention will hereinafter more fully appear from the following detailed description, taken in connection with the accompanying drawings in which:—

Fig. 5 is a fragmentary plan view of certain latch members employed by the invention.

Like reference characters refer to like parts throughout the drawings.

Figure 1:
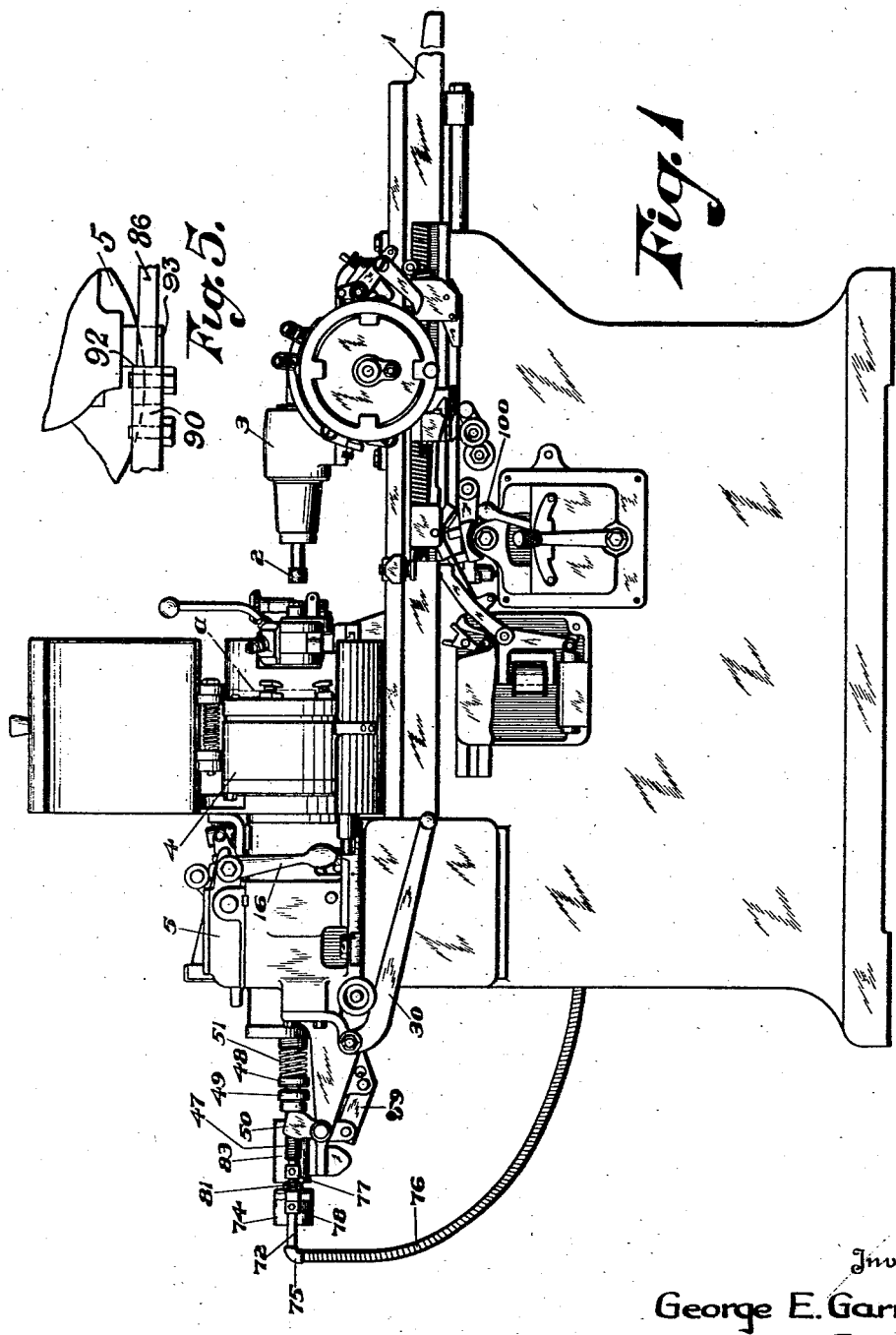
Fig. 1 is a front elevation of a grinding machine provided with a work head embodying the invention.

Referring first to Fig. 1, the work head of the invention is shown applied to a grinding machine having a reciprocatory table or carriage 1 by the reciprocation of which a grinding traverse is produced between a grinding wheel 2 and a workpiece to be ground. The grinding wheel is rotatably carried by a wheel head 3 while the work piece *a* is carried by a chuck 4 rotatably mounted in a work head 5 which constitutes the subject matter of the present invention. As shown in Fig. 1 the wheel head 3 is carried by the reciprocatory table 1 while the work head 5, although angularly adjustable, is stationarily mounted on the base of the grinding machine, but it should be understood that the apparatus of the present invention may equally well be applied, with slight modifications, to a work head carried by a moving table or carriage.

Figure 2:
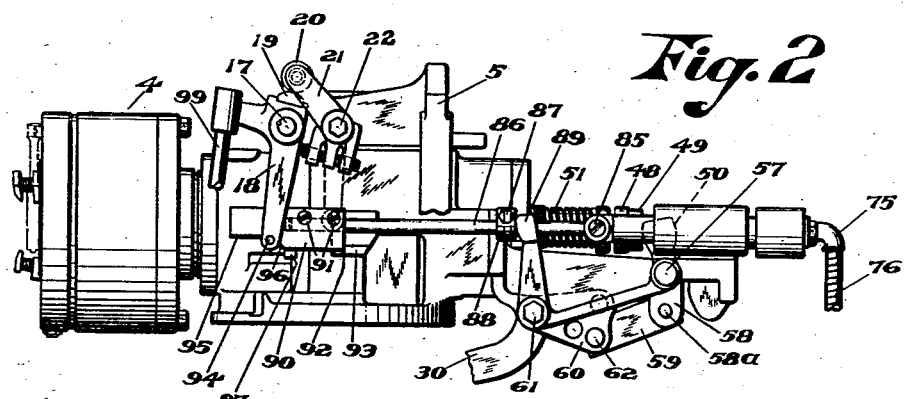
Fig. 2 is a rear elevation of the work head.
Figure 3:
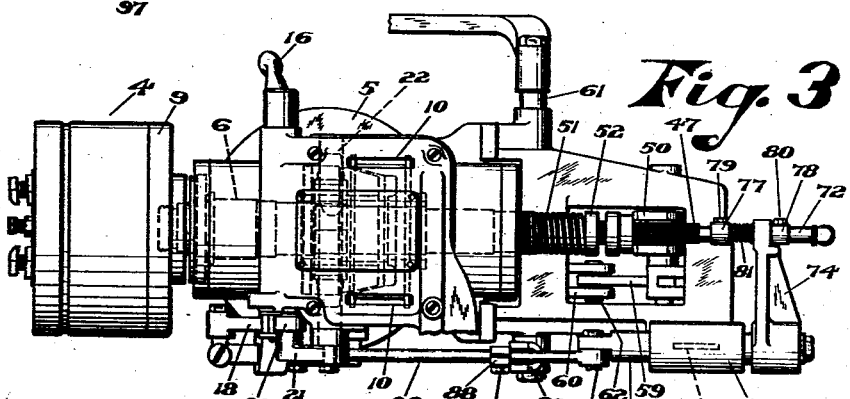
Fig. 3 is a plan view of the same.
Figure 4:
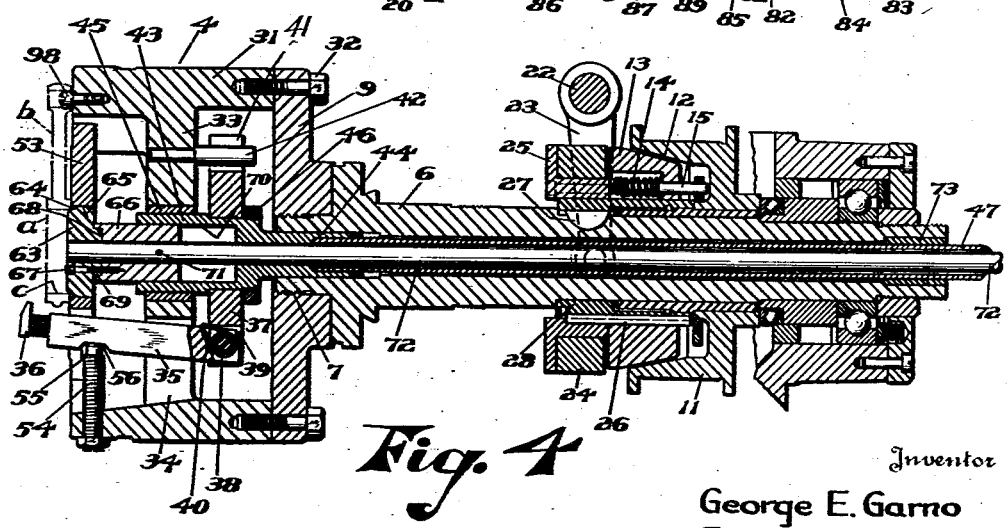
Fig. 4 is a longitudinal sectional view through the chuck and bearing sleeve.

The chuck 4 is mounted upon a rotatable spindle 6 which provides screw threads 7 for engagement with a threaded axial hole in a plate 9 which comprises part of the body of the chuck. The spindle and chuck may be rotated by any suitable drive; in this embodiment of the invention the chuck it rotated through a belt drive, the belt passing through slots 10, 10 provided in the work head as shown in Fig. 3. The belt passes around a pulley 11 which, as shown in Fig. 4, is rotatably mounted on, but not fastened to, the spindle 6. This pulley comprises one element of a clutch, said pulley providing an interior frusto conical surface 12 with which a slidable clutch member 13, having an exterior frusto conical-surface, is in engagement when the spindle 6 is in rotation. Without describing in minute detail the exact construction and operation of the clutch shown in Fig. 4 for the reason that any desired form of clutch might be substituted therefor, it is sufficient to note that the members 11 and 13 are urged together by springs 14 mounted on pins 15 passing through the slidable element 13 of the clutch, and that said slidable element may be withdrawn from engagement with the element 11 of the clutch by means of a hand lever 16 provided on the front of the machine. The lever 16 is fastened to a shaft 17, a lever 18 being fastened to said shaft on the rear of the work head. The lever 18 provides a cam surface 19 which is adapted to engage a roller 20 on an arm 21 that is fastened to a shaft 22 extending into the work head. Inside the work head a yoke 23 is fastened to said shaft 22, and when the shaft 22 is moved in a clockwise direction as the parts are viewed in Figs. 2 and 4, the yoke 23 moves a collar 24, which is mounted between the slidable clutch member 13 and another annular member 25 fastened thereto, and thus withdraws these members from the pulley 11. It will be understood that the members 13 and 25 are keyed to the spindle 6, and this may be done in any suitable way, that shown in the present instance involving the use of a pair of keys 26 and 27 and an interposed bushing 28.

As shown in Fig. 1 the machine, besides providing the stop and start lever 16 for actuating the clutch just described, provides a control lever 30 by means of which the chuck may be opened and closed. This lever 30 operates chuck fingers to force a workpiece against the work-centering member of our invention, said member being designated by the numeral 63. According to the invention, as hereinafter described, the centering member or plug 63 is not withdrawn into the chuck until said chuck has been started in rotation by the movement of the lever 16. Before describing the connections between the chuck and its operating mechanism, which in the present embodiment of the invention includes a chuck draw bar well known to the art, we will describe the chuck construction itself.

Referring now to Fig. 4, a generally cylindrical hollow member 31 is secured as by bolts 32 to the plate 9, these two parts comprising the body of the chuck. The interior of the member 31 is separated into two compartments by means of a radial web 33 which, however, itself is pierced by a bore coaxial with the chuck and provides three slots 34. A plurality of fingers 35 are located in the aforesaid slots, one in each, these fingers having adjustable jaws 36 for the gripping of a workpiece. When the lever 30 is moved downwardly the several fingers 35 are all moved forwardly together, and when the lever 30 is released, the said fingers move in unison rearwardly of said chuck by spring pressure, and the faces of the jaws 36 engage a workpiece a. To that end, the several fingers 35 are carried by a single member 37 located in the rear compartment of the chuck, the fingers being pivotally attached to the member 37 as by pins 38. The member 37 is generally disk-like in form but provides a plurality of slots 39 for the reception of the fingers 35, the rear ends of which are also slotted for the reception of small coil springs 40 to force the fingers resiliently apart as shown in Fig. 4. A slot 41 is likewise provided by the disk 37 to receive a pin 42 which projects from the central web 33, in order to compel the disk to rotate with the chuck and to guide it.

The disk 37 is somewhat loosely mounted on a sleeve 43 provided on the front of a sleeve 44 of smaller diameter which extends into the bore of the spindle 6. The sleeve 43 is longitudinally reciprocable in the chuck being in engagement with a bearing ring 45 provided by the radial flange 33. The disk 37 may be held to the sleeve by means of a nut 46.

In the bore of the spindle 6 is a long tube or sleeve 47 which is fastened to the sleeve 44 as by screw threaded engagement therewith. The sleeve 47, as best shown in Figs. 2 and 3, extends rearwardly of the work head 5. To the outer end of the sleeve 47 is fastened a pair of nuts or collars 48 and 49 against the outer of which a forked member 50 bears. Surrounding the threaded projecting end of the sleeve 47 is a coil spring 51 one end of which bears against the end of the spindle 6 and the other end of which is engaged by a nut 52, in order that the tension of the spring may be adjusted. It will thus be seen that the sleeve 47 and consequently the sleeves 43 and 44 are urged rearwardly of the machine at all times, but may be forced forwardly by actuation of the forked member 50.

When the fork 50 is not pressing the sleeve 47 forward and when, therefore, the spring 51 is exerting its tension to draw the aforesaid parts into the chuck, the fingers 35 and jaws 36 are in position to hold a workpiece a against a front plate 53 provided by the chuck, the fingers 35 being forced together to bring the jaws 36 into engagement with said workpiece by means of adjustable screws 54 which are adapted to engage cam surfaces 55 provided by the fingers 35, and thus force them together against the tension of the short coil springs 40. When, however, the fork 50 is moved forwardly by the means to be described, the sleeve 47, the sleeves 43 and 44, the disk 37, and consequently the fingers 35 are moved, the latter being projected forwardly from the front of the chuck and being spread radially, the end of the bolts 54 resting in depressions 56. The chuck is then ready for the insertion of a workpiece a.

The hand lever 30, when it is depressed, actuates the forked member 50 in the following manner. The forked member 50 is fastened to a shaft 57 that is journalled in a projecting frame portion extending rearwardly of the work head 5. A downwardly projecting arm 58 fastened to the shaft 57 is connected by a pair of links 59 and 60 to a shaft 61 to which the handle 30 is fastened, the link 60 being likewise fastened to said shaft, and the pair of links 59 and 60 constituting a toggle connection, being connected together by a pin 62. It will thus be seen that depression of the handle 30 actuates the toggle to move the lower end of the arm 58 to the right in Fig. 2, thus to press the upper end of the forked lever 50 to the left against the collar 49, moving the parts forwardly in the chuck as described.

Such actuation of the lever 30 likewise causes the centering plug 63 to be moved forwardly in the chuck in order that the workpiece to be placed in the machine may be centered thereon. As shown in Fig. 4, the centering plug 63 provides a beveled periphery 64, which will accurately center a workpiece having an internal bore, making its axis coincide with the axis of the chuck. The centering plug is accurately located in respect to the axis of the chuck by means of an internal cylindrical bore 65, provided by the front plate 53, which bore should be slightly larger than the ultimate internal diameter of the workpiece a, and to this end the front plate 53 is detachable and may be replaced by other front plates of different sizes. The centering plug 63 is detachably fastened to a cylindrical member 66, as by means of a screw 67, centering notches 68 and 69 of like diameter being provided both on the plug 63 and the cylindrical member 66. The cylindrical member 66 fits in the internal cylindrical bore 70 of the sleeve 43, which rotates around it and consequently constitutes a bearing for it, and the cylindrical member 66 is fastened, as by means of a pin 71, to a long hollow non rotating tube 72. Said tube extends from the very front of the chuck entirely through the spindle 6, being inside of the sleeve 47, and desirably is the usual water or coolant conveying tube usually provided in internal grinding machines. The rear end of the sleeve 47 is supported from the spindle 6 as by means of an interposed bushing 73. It will be remembered that the sleeve 47, which constitutes a draw rod to actuate the chuck, rotates with the spindle 6, and consequently the tube 72 which conveys the coolant and which does not rotate should be supported to prevent contact between these tubes with consequent rattling and wear. To this end the tube 72 is supported by a bracket 74 through which it passes, this bracket being also made use of to move the tube and consequently the centering plug 63 longitudinally of the chuck. The outermost end of the tube 72 is connected as by means of a coupling 75 to a flexible connection 76 leading to the coolant pump.

Movement of the bracket 74 to the right in Fig. 3 results in drawing the centering plug 63 inwardly of the chuck, while movement of said bracket to the left as viewed in said figure results in movement of said plug forwardly, in which position, as shown in Fig. 4, it is held not positively, but resiliently. To that end a pair of collars 77 and 78 are positioned on the coolant tube 72, and fastened in any desired position of adjustment, as by means of set screws 79 and 80; between the bracket 74 and the forward collar 77 a coiled spring 81 is interposed.

The bracket 74 is carried by one end of a member 82, the latter being slidably mounted in a supporting portion 83 of the work head, but kept from turning therein, as by a key 84. The other end of the slidable member 82 carries a pin 85, on which is pivoted a forwardly projecting rod 86; a collar 88 is secured to rod 86 by a set screw 87, and is adjustable lengthwise thereof. When the lever 30 is depressed to move the work holding fingers in the chuck as already described the upper forked end of an arm 89, fastened to the shaft 61, is moved against the collar 88, thus moving the rod 86 to the left, Figs. 2 and 3, and consequently moving the pipe 72 forwardly in the chuck 4, by reason of the connection of the rod 86 to the rod 82 and the connection of the latter to the pipe 72, through the medium of the bracket 74. This projects the centering plug 63 forwardly, but it will be noted that the latter can be forced rearwardly against pressure of the spring 81.

The rod 86 has secured to its forward end, as by screws 91, 91, a block 90, the latter normally resting on a supporting ledge 93 of the work head. When the rod 86 is moved inwardly (to the left in Fig. 2) by depression of lever 30, as above described, the block 90, as it passes beyond the inner end 92 of ledge 93, drops downwardly, being then supported by engagement of its under surface 95 with a pin 94 on the lever arm 18. In this position, the return or right hand movement of rod 86 is prevented, until the block 90 is raised, the end or shoulder 92 of the ledge 93 acting as a latch or abutment for the block. The lever arm 18, as already described, swings with the clutch operating lever 16, and the counterclockwise rotation, Fig. 2, of arm 18, when the clutch is thrown in by lever 16, engages the pin 94 with an inclined surface 96 of block 90, to raise said block, thus lifting it clear of the shoulder 92. The further counterclockwise movement of the arm 18 shifts the block 90, the rod 86, the member 82, the bracket 74, the coolant tube 72 and the plug 63 to the right, Figs. 2, 3, and 4, because of the engagement of the pin 94 with a projection 97 at the end of the inclined surface 96. It will be understood, of course, that this action cannot take place until the lever 30 is raised, as until this time the forked arm 89 is in contact with the collar 88, and this is a desirable feature of construction because the chuck should not be started in rotation until the chuck jaws are closed upon a workpiece.

In the use and operation of our invention, the operator, when the chuck parts are in the position illustrated by Fig. 4, places a workpiece a against the front plate 53 of the chuck, in such manner that the hole or bore c, which is a part of the workpiece that is to be ground, is registered, or substantially registered, with the centering plug 63, — the latter at that time projecting forwardly beyond the surface of face plate 53. The workpiece a, in the form shown by the broken lines in Fig. 4, has a projecting arm b, and this, if desired, may be suitably engaged with a projection or stud 98 on the face of the chuck. With the workpiece so positioned, so as to center its bore c by the plug 63, the operator then raises the lever 30 on the front of the machine, which throws the toggle connection 59, 60 out of line, and the heavy coiled spring 51 then comes into operation and, drawing the draw rod 47 inwardly of the chuck, retracts the work holding fingers 35. The jaws 36 consequently press against the front surface of the workpiece a, forcing the rear edge of the hole c against the beveled surface 64 on the plug 63. This action accurately centers the workpiece and also, when the workpiece a contacts with the front plate 53, securely clamps it in position. By the act of raising the lever 30 to thus clamp the workpiece a in centered position, the arm 89 is withdrawn from the collar 88 on the shaft 86, and only the shoulder 92, acting through the compressed spring 81, is holding the plug 63 against the workpiece. Having thus positioned the workpiece in the chuck, the operator now moves the lever 16 in a clockwise direction, Fig. 1, which simultaneously acts to cause the clutch members 11, 13 to be forced into engagement by the springs 14, and which likewise positively retracts the plug 63 into the chuck, the cylindrical member 66, sliding in the sleeve 43. The connections between the lever 16 and the clutch on the one hand, and the means for retracting the plug 63 on the other hand, have already been fully described. The chuck 4 is now in rotation in the work head 5 with the workpiece a firmly clamped in position, and the flow of coolant having been turned on, as by means of a connecting rod 99 connected to the lever arm 18 as shown in Fig. 2, the machine is in all respects ready for the engagement of the grinding wheel 2, with the workpiece. To cause the latter operation the operator shifts a controlling lever 100 on the front of the machine to the left, which causes the table 1 to travel to the left carrying the rotating grinding wheel 2 into the workpiece, but since this operation forms no part of the present invention it will not be further described. It should be noted that by reason of the retraction of the plug 63 into the chuck as fully set forth, the grinding wheel 2 may travel beyond the edge of the workpiece a partially into the chuck, without any danger of contact between it and the centering plug 63 or the coolant pipe 72.

We claim:

1. In apparatus of the class described, the combination with a rotatable chuck, means to open and close the chuck, and means to start and stop the chuck, of a work centering plug in said chuck, means actuated by the opening and closing means when said chuck is opened for moving said plug to work centering position, and means actuated by the starting and stopping means when said chuck is started in rotation for moving said plug out of work centering position.

2. In apparatus of the class described, the combination with a rotatable chuck, and a clutch for stopping and starting the rotation of said chuck, of a member projecting from said chuck, when the latter is stationary, to engage and center a work piece, and means operated by the engagement of the elements of said clutch for drawing said member into said chuck, away from engagement with said workpiece.

3. In apparatus of the class described, the combination with a rotatable chuck, and a chuck operating lever to open and close said chuck, of a work centering plug in said chuck, means responsive to movement of said lever to open said chuck for placing said plug in work centering position, and latch means to hold it in said position.

4. In apparatus as claimed in claim 3, the combination with the elements therein specified, of a clutch mechanism for controlling the rotation of said chuck, and means responsive to movement of said clutch mechanism for releasing said latch.

5. In apparatus of the class described, the combination with a rotatable chuck, a set of work-holding jaws to hold an article in said chuck, a spider holding said jaws, a member movable axially within said chuck to procure the movements of said spider for opening and closing said jaws, and a centering device, to engage and center said article when the same is held by said jaws, said centering device being supported and guided by said member for axial movement relative thereto.

6. In a work head for grinding machines, the combination with a rotary work-holding chuck, means for opening and closing said chuck, and a clutch to stop and start the rotation of said chuck, of a work-centering device moved into operative work-engaging position by the opening of said chuck, and means operated by the engagement of said clutch, in starting the rotation of said chuck, for withdrawing said device from its engagement with the work.

GEORGE E. GARNO.
EUGENE A. ENGSTROM.